United States Patent
Groarke et al.

(10) Patent No.: US 9,818,117 B2
(45) Date of Patent: *Nov. 14, 2017

(54) SYSTEMS AND METHODS FOR USING SOCIAL NETWORK DATA TO DETERMINE PAYMENT FRAUD

(71) Applicant: MasterCard International Incorporated, Purchase, NY (US)

(72) Inventors: Peter J. Groarke, Dublin (IE); Ahmed Hosny, Dublin (IE)

(73) Assignee: Mastercard International Incorporated, Purchase, NY (US)

(*) Notice: Subject to any disclaimer, the term of this patent is extended or adjusted under 35 U.S.C. 154(b) by 40 days.

This patent is subject to a terminal disclaimer.

(21) Appl. No.: 15/231,425

(22) Filed: Aug. 8, 2016

(65) Prior Publication Data
US 2016/0350760 A1 Dec. 1, 2016

Related U.S. Application Data

(63) Continuation of application No. 14/479,718, filed on Sep. 8, 2014, now Pat. No. 9,418,365.

(51) Int. Cl.
*G06Q 20/40* (2012.01)
*G06Q 50/00* (2012.01)

(52) U.S. Cl.
CPC ......... *G06Q 20/4016* (2013.01); *G06Q 50/01* (2013.01)

(58) Field of Classification Search
USPC .............................. 235/380; 705/7.28, 39, 44
See application file for complete search history.

(56) References Cited

U.S. PATENT DOCUMENTS

| | | | |
|---|---|---|---|
| 7,246,740 B2 | 7/2007 | Swift et al. |
| 8,285,598 B2 | 10/2012 | Mesaros |
| 8,401,918 B2 | 3/2013 | Mesaros |
| 8,504,423 B2 | 8/2013 | Rotbard et al. |
| 8,630,921 B2 | 1/2014 | Nuzzi et al. |
| 8,819,789 B2 | 8/2014 | Orttung et al. |
| 2010/0293090 A1 | 11/2010 | Domenikos et al. |
| 2011/0145137 A1 | 6/2011 | Driemeyer et al. |
| 2012/0226579 A1 | 9/2012 | Ha et al. |

(Continued)

OTHER PUBLICATIONS

PCT Search Report and Written Opinion for related application PCT/US2015/048619 dated Dec. 18, 2015; 10 pp.

*Primary Examiner* — Allyson Trail
(74) *Attorney, Agent, or Firm* — Armstrong Teasdale LLP

(57) ABSTRACT

A computer-implemented method for analyzing potentially fraudulent e-commerce payment transactions utilizing social media data is provided. The method uses a fraud monitoring device in communication with a memory. The method includes receiving a request to assess the fraud risk of an online transaction initiated by a cardholder using a payment card and accessing a social media account associated with the cardholder. The social media account includes a circle of friends, where each friend in the circle of friends is associated with a social media account. The method also includes determining one or more historical transactions associated with at least one friend in the circle of friends, calculating a social risk score for the cardholder based in part on the determined one or more historical transactions, and transmitting a consolidated risk assessment of the online transaction based in part on the social risk score.

20 Claims, 7 Drawing Sheets

(56) References Cited

U.S. PATENT DOCUMENTS

2014/0067656 A1 3/2014 Cohen et al.
2014/0129380 A1 5/2014 Nuzzi et al.
2014/0279518 A1 9/2014 Acuna-Rohter
2015/0106154 A1 4/2015 Wilhelm et al.
2015/0161606 A1 6/2015 Lee
2015/0170148 A1 6/2015 Priebatsch

SYSTEMS AND METHODS FOR USING SOCIAL NETWORK DATA TO DETERMINE PAYMENT FRAUD

CROSS REFERENCE TO RELATED APPLICATIONS

This application is a continuation of U.S. patent application Ser. No. 14/479,718, filed Sep. 8, 2014 the disclosure of which is hereby incorporated herein by reference in their entirety which is hereby incorporated by reference in its entirety.

BACKGROUND OF THE DISCLOSURE

The field of the disclosure relates generally to enhanced security surrounding online payment card transactions, and more specifically to method and systems for incorporating social network data into a fraud risk assessment for payment transactions.

Fraudulent payment transactions impose significant costs on users of a payment network, including merchants, banks, and individual cardholders. Accordingly, known payment networks often employ fraud prevention systems to flag or deny potentially fraudulent payment transactions. For example, when an online merchant receives an online purchase request, many online merchants determine whether to proceed or not with the purchase request based on a fraud/risk analysis. The fraud risk analysis can involve analyzing information such as, but not limited to payment account, browser (or native) device information, shipping address, IP address, and email address. This fraud risk analysis is an effort to determine if the purchase is fraudulent or not.

If the purchaser has previously shopped at the merchant (or merchant's agent) then the fraud risk analysis becomes easier and is more likely to result in a successful outcome because the merchant has a prior relationship with the purchaser. Therefore, the merchant has information about previous transactions to apply to the information above. Not having this previous transaction information, the fraud risk analysis of the first purchase is harder for the merchant to determine if the purchase is genuine or not. Thus the first purchase has a far higher probability of being not allowed by the merchant's fraud risk analysis.

Social media networks provide a digital identity that can be used to identify an individual and provide means for connection different people together. These people usually have things in common and in a lot of cases are connected in real life as well as in the social network space. Among the common things that people have in common is spending patterns. Individually these connected people may be referred to as the individual's friends (also known as connections, contacts, and followers), and collectively as the individual's circle of friends.

BRIEF DESCRIPTION OF THE DISCLOSURE

In one aspect, a computer-implemented method for analyzing potentially fraudulent e-commerce payment transactions utilizing social media data is provided. The method uses a fraud monitoring device in communication with a memory. The method includes receiving by the fraud monitoring device a request to assess the fraud risk of an online transaction initiated by a cardholder using a payment card. The fraud risk request includes a cardholder identifier. The method also includes accessing a social media account associated with the cardholder based at least in part on the cardholder identifier. The social media account includes a circle of friends, where each friend in the circle of friends is associated with a social media account. The method further includes determining one or more historical transactions associated with at least one friend in the circle of friends, calculating by the fraud monitoring device a social risk score for the cardholder based in part on the determined one or more historical transactions, and transmitting by the fraud monitoring device a consolidated risk assessment of the online transaction based in part on the social risk score.

In another aspect, a computer system for analyzing potentially fraudulent e-commerce payment transactions utilizing social media data is provided. The computer system includes a memory device for storing data, and one or more processors in communication with said memory device. The one or more processors are programmed to receive a request to assess the fraud risk of an online transaction initiated by a cardholder using a payment card. The fraud risk request includes a cardholder identifier. The one or more processors are also programmed to access a social media account associated with the cardholder based at least in part on the cardholder identifier. The social media account includes a circle of friends, where each friend in the circle of friends is associated with a social media account. The one or more processors are further programmed to determine one or more historical transactions associated with at least one friend in the circle of friends, calculate a social risk score for the cardholder based in part on the determined one or more historical transactions, and transmit a consolidated risk assessment of the online transaction based in part on the social risk score.

In yet another aspect, a computer-readable storage medium having computer-executable instructions embodied thereon is provided. When executed by a computing device having at least one processor coupled to a memory device, the computer-executable instructions cause the processor to receive a request to assess the fraud risk of an online transaction initiated by a cardholder using a payment card. The fraud risk request includes a cardholder identifier. The computer-executable instructions also cause the processor to access a social media account associated with the cardholder based at least in part on the cardholder identifier. The social media account includes a circle of friends, where each friend in the circle of friends is associated with a social media account. The computer-executable instructions further cause the processor to determine one or more historical transactions associated with at least one friend in the circle of friends, calculate a social risk score for the cardholder based in part on the determined one or more historical transactions, and transmit a consolidated risk assessment of the online transaction based in part on the social risk score.

BRIEF DESCRIPTION OF THE DRAWINGS

FIG. 1 is a schematic diagram illustrating an example multi-party transaction card industry system for enabling ordinary payment-by-card transactions in which merchants and card issuers do not need to have a one-to-one special relationship.

FIG. 2 is a simplified block diagram of an example system for use identifying fraudulent payment transactions using social media data associated with a cardholder.

FIG. 3 illustrates an example configuration of a user computer device operated by a user such as cardholder computing device shown in FIG. 2, in accordance with one embodiment of the present disclosure.

FIG. 4 illustrates an example configuration of a server computer device such as server system shown in FIG. 2, in accordance with one embodiment of the present disclosure.

FIG. 5 is a flowchart of an example process implemented by the fraud monitoring device shown in FIG. 2 to register a cardholder with a social media payment processing program.

FIG. 6 is a flowchart of an example process implemented by the fraud monitoring device 221 shown in FIG. 2 to perform risk assessment of payment transactions based on social media connection data.

FIG. 7 is a diagram of components of one or more example computing devices that may be used in the system shown in FIG. 2.

DETAILED DESCRIPTION OF THE DISCLOSURE

Figure 1:
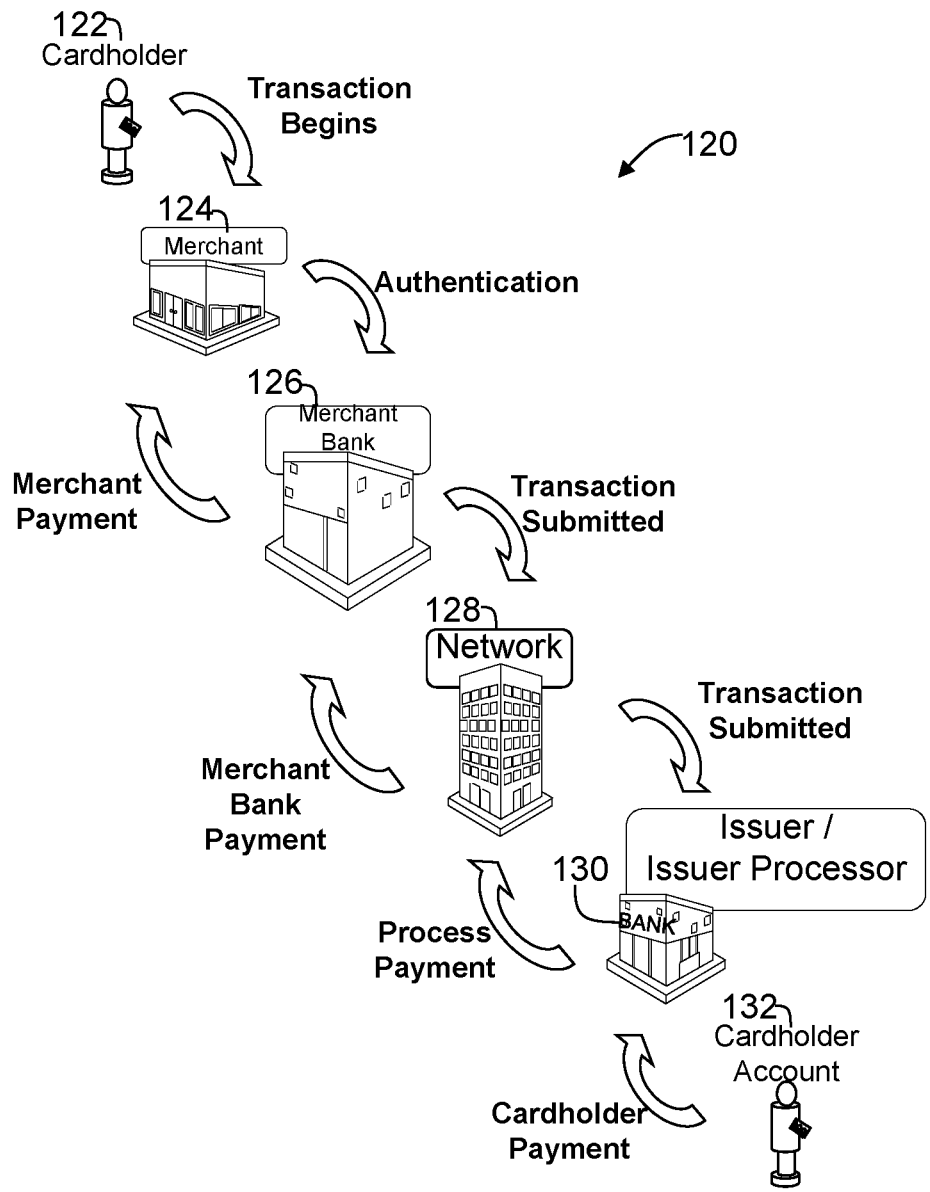
FIGS. 1-7 show example embodiments of the methods and systems described herein.

Embodiments of the present disclosure describe a payment network that processes payment transactions performed between a merchant and a cardholder. The payment network includes a fraud monitoring device that facilitates identifying fraudulent payment transactions performed over the payment network using the social media connection data of the cardholder. More specifically, the fraud monitoring device retrieves social media connection data of the cardholder, e.g., the cardholder's circle of friends, and determines the transaction history of one or more of the cardholder's friends to calculate a social risk score. The fraud monitoring device is further configured to determine whether the payment transaction is fraudulent based on the results of the social risk score.

As used herein, the term "social media data" means any data associated with a social media account of a cardholder, for example, date of birth, high school attended, etc. As used herein, the term "social media connection data" includes any data associated with a social media account of the cardholder that indicates the other social media accounts that the cardholder has connected with. For example social media connection data may be identifying information to identify some or all of the members of the cardholder's circle of friends.

In the example embodiment, a cardholder registers with a social media payment processing program running on a fraud monitoring device. The fraud monitoring system receives registration information from the cardholder including a social media identifier for a social media account and a cardholder identifier. The social media account may be a cardholder account for any type of social media, for example, social networking, blogging, micro-blogging, professional networking, status updating, internet forum communications, etc. The social media identifier is a unique alphanumeric series that identifies an individual social media account, e.g., a link or an email. The cardholder identifier could be the cardholder's payment account number or other unique identifier that represents the cardholder's payment card account. The fraud monitoring device associates the social media identifier and the cardholder identifier and stores them in a database. The fraud monitoring device may be associated with an individual merchant or a payment card processing network.

As part of processing an ecommerce payment transaction, the individual merchant or the payment card processing network use the fraud monitoring device to determine whether the transaction is fraudulent. The fraud monitoring device receives the transaction data, which includes a cardholder identifier. In the example embodiment, the fraud monitoring device associates the cardholder with a social media account based on the cardholder identifier. In other embodiments, the fraud monitoring device receives the social media identifier along with the transaction data.

The fraud monitoring device accesses at least a portion of the social media account of the cardholder and retrieves social media connection data. The fraud monitoring device transmits the social media identifier to a social media computing device to access the social media account associated with the cardholder. In the example embodiment, the fraud monitoring device executes one or more application programming interfaces (API) to access social media information about the social media account. In other embodiments, the fraud monitoring device logs directly into the social media account.

With access to the social media account, the fraud monitoring device calculates a personal risk score for the transaction based at least in part on information in the social media account. In the example embodiment, the fraud monitoring device determines one or more historical payment card transactions associated with the cardholder based on data in the cardholder's social media account. In one example, the cardholder registered more than one cardholder identifier, where each cardholder identifier represents a different payment card account, with the social media identifier. In this example, the fraud monitoring device retrieves the additional cardholder identifiers from the database, determines one or more historical payment transactions associated with those additional cardholder identifiers, and uses those transactions to calculate the personal risk score. In another example, the transaction data does not include the cardholder's name or other personally identifying information. From the social media account, the fraud monitoring device determines the identity of the cardholder and determines one or more additional payment card accounts associated with the cardholder. Using the one or more additional payment card accounts, the fraud monitoring device determines one or more historical payment card transactions and uses those transactions to calculate the personal risk score.

In other embodiments, the fraud monitoring device accesses the social media account to determine other information about the cardholder, such as, but not limited to, address, IP address, email address, and other information about a cardholder computing device. For example, the fraud monitoring device compares the cardholder computing device to a client system that is being used to conduct the payment transaction in question. If the devices match, then the fraud monitoring device calculates the personal risk score to indicate that. If, for example, the IP addresses indicate that the cardholder computing device is located in Montana and the client system is in Florida, then the fraud monitoring device calculates the personal risk score to reflect that. In further embodiments, the fraud monitoring device accesses the cardholder's social media account to access the cardholder's browser history. For example, if the payment transaction is for a carpet, then fraud monitoring device reviews the cardholder's browser history to determine if the cardholder has an interest in carpets and calculates the personal risk score to reflect that interest or the lack thereof. The fraud monitoring device is not limited to only using one of the above embodiments, but may use any combination of the above embodiments to calculate the cardholder's personal risk score.

The fraud monitoring device accesses the cardholder's social media account from the social media computing device to retrieve the cardholder's circle of friends. In the example embodiment, the fraud monitoring device determines a social media identifier associated with a friend in the circle of friends, where the friend registered the social media identifier with the social media payment processing program on the fraud monitoring device. The fraud monitoring device retrieves the friend's card identifier from the database. Using the friend's retrieved cardholder identifier, the fraud monitoring device determines at least one payment card account associated with the friend. In other embodiments, the fraud monitoring device uses the friend's social media identifier to access the friend's social media account to determine an identity for the friend. Using that determined identity, the fraud monitoring device determines at least one payment card account associated with the friend.

The fraud monitoring device determines one or more historical transactions associated with the determined payment card account. Using those historical transactions, the fraud monitoring device calculates a social risk score for the transaction. Although the example embodiment only describes calculating a social risk score for one friend of the cardholder's circle of friends, historical transactions for multiple friends may be used to calculate the social risk score. The more fraudulent transactions that are found in the cardholder's circle of friends, the higher the likelihood that the payment transaction is fraudulent.

In some embodiments, the fraud monitoring device is associated with the merchant and receives the transaction data directly from the merchant. In these embodiments, the fraud monitoring device determines an identity for one or more of the friends in the circle of friends. Based on the determined identities, the fraud monitoring device analyzes the merchant's past transactions with the identified friends and calculates the social risk score based on those past transactions.

The fraud monitoring device generates a consolidated risk assessment of the payment transaction based on the personal risk score and the social risk score. In the example embodiment, the fraud monitoring device transmits the consolidated risk assessment to the device that the transaction action was received from, i.e., the merchant or the payment network.

In situations in which the systems discussed herein collect personal information about the cardholder, or may make use of personal information, the cardholder may be provided with an opportunity to control whether programs or features collect the personal information (e.g., information about a cardholder's social network, social actions or activities, profession, interests, preferences, or current location). In addition, social media data may be treated in one or more ways before it is stored or used, so that personally identifiable information is removed. For example, a cardholder's identity may be treated so that no personally identifiable information can be determined for the cardholder, in addition, a cardholder's geographic location may be generalized where location information is obtained (such as a city, a ZIP code, or state level), so that a particular location of the cardholder cannot be determined. In addition, the cardholder may control what type of information is available to the system. For example, the cardholder may allow access to all social media data. Alternatively, the cardholder may allow access only to social media connection data. Thus, the cardholder may have control over how information is collected about the cardholder and used by the fraud monitoring device.

In some embodiments, system stores transaction data or social media data without including sensitive personal information, also known as personally identifiable information or PII, in order to ensure the privacy of individuals associated with the stored data. Personally identifiable information may include any information capable of identifying an individual. For privacy and security reasons, personally identifiable information may be withheld from the cardholder profiles. In some examples where privacy and security, such as through encryption, can otherwise be ensured, or where individuals consent, personally identifiable information may be retained in the cardholder profiles. In such examples, personally identifiable information may be needed to reports about groups of cardholders. In situations in which the systems discussed herein collect personal information about individuals including cardholders or merchants, or may make use of such personal information, the individuals may be provided with an opportunity to control whether such information is collected or to control whether and/or how such information is used. In addition, certain data may be processed in one or more ways before it is stored or used, so that personally identifiable information is removed. For example, an individual's identity may be processed so that no personally identifiable information can be determined for the individual, or an individual's geographic location may be generalized where location data is obtained (such as to a city, ZIP code, or state level), so that a particular location of an individual cannot be determined. Thus, the individual may have control over how information is collected about the individual and used by systems including the travel application.

The methods and systems described herein may be implemented using computer programming or engineering techniques including computer software, firmware, hardware, or any combination or subset wherein a technical effect of the systems and processes described herein is achieved by performing at least one of the following steps: (a) receiving registration information, from a cardholder, including a social media identifier and a payment card account identifier; (b) storing the social media identifier and the payment card account identifier in a database; (c) receiving a request to assess the fraud risk of an online transaction initiated by a cardholder using a payment card; (d) accessing a social media account that is associated with the cardholder; (e) calculating a personal risk score for the cardholder based in part on the social media account associated with the cardholder; (0 determining a social media identifier associated with a friend in the circle of friends; (g) determining at least one payment card associated with the friend; (h) determining one or more historical transactions associated with the friend based on the at least one payment card; (i) calculate a social risk score for the cardholder based on the determined one or more transactions; (j) generating a consolidated risk assessment of the transaction based on the personal risk score and the social risk score; (k) transmit the consolidated risk assessment, and increasing the accuracy of fraud risk assessment for online transactions.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-party transaction card industry system 120 for enabling ordinary payment-by-card transactions in which merchants 124 and card issuers 130 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
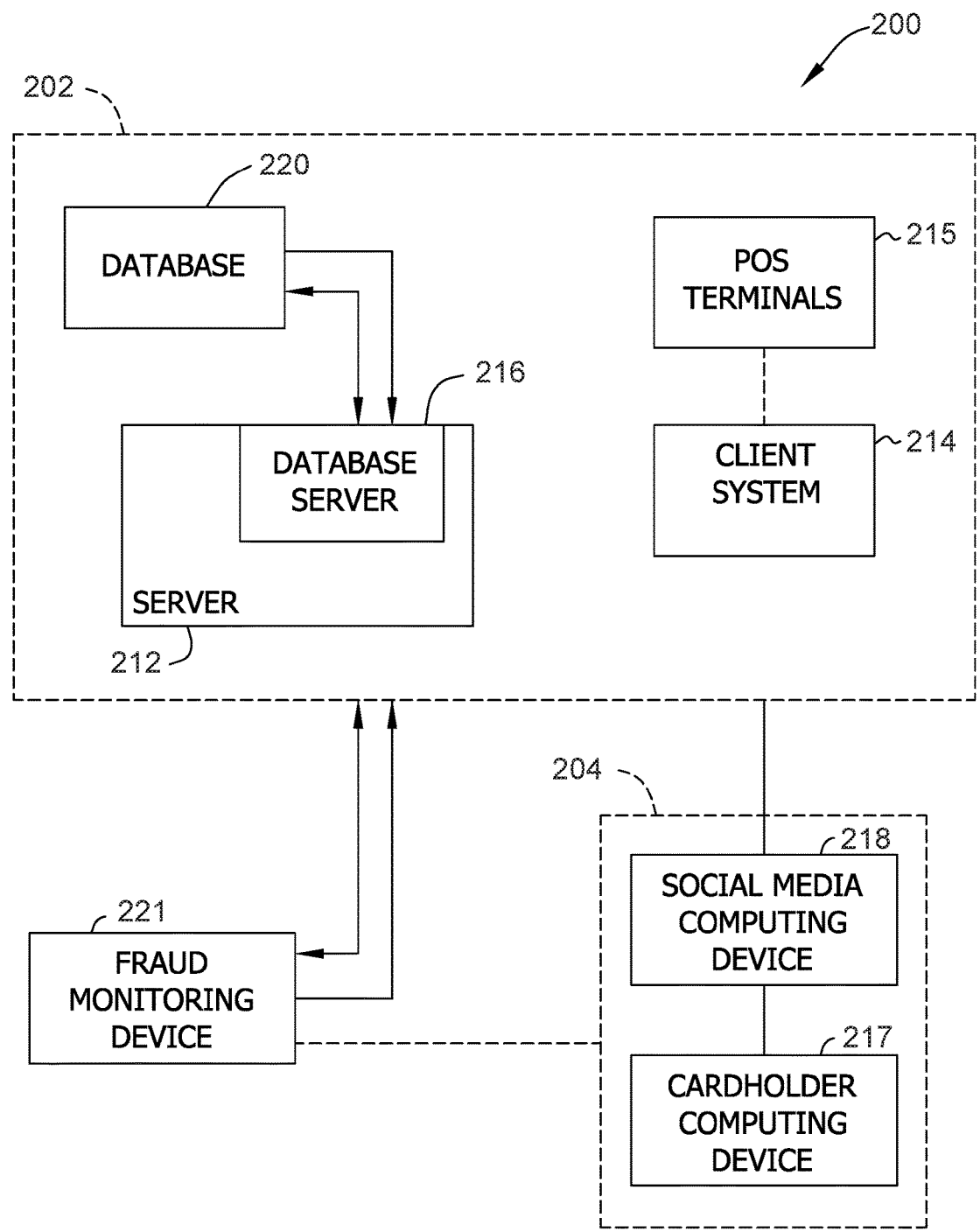

FIG. 2 is a simplified block diagram of an example system 200 for use identifying fraudulent payment transactions using social media data associated with cardholder 122 (shown in FIG. 1). System 200 includes a plurality of systems and computing devices, such as a payment sub-system 202, a services sub-system 204, and a fraud monitoring device 221. Payment sub-system 202 includes a plurality of computer devices such as server system 212, client systems 214, POS terminals 215, and database 220. Payment sub-system 202 processes payment transactions between a cardholder and a plurality of merchants, and generates transaction data based on those payment transactions. Services sub-system 204 includes a cardholder computing device 217 and a social media computing device 218. Social media computing device 218 stores social media data associated with a social media account of the cardholder. Cardholder 122 may access the social media data and provide authorization for fraud monitoring device 221 to access the social media data. Fraud monitoring device 221 is configured to determine whether a payment transaction is fraudulent.

In the example embodiment, payment sub-system 202 includes server system 212, and a plurality of client systems 214 connected to server system 212. In one embodiment, client systems 214 are computers including a web browser, such that server system 212 is accessible to client systems 214 using the Internet. Client systems 214 are interconnected to the Internet through many interfaces including a network, such as a local area network (LAN) or a wide area network (WAN), dial-in-connections, cable modems, and special high-speed Integrated Services Digital Network (ISDN) lines. Client systems 214 could be any device capable of interconnecting to the Internet including, but not limited to, a desktop computer, a laptop computer, a personal digital assistant (PDA), a cellular phone, a smartphone, a tablet, a phablet, or other web-based connectable equipment.

Payment sub-system 202 also includes point-of-sale (POS) terminals 215, which may be connected to client systems 214, and may be connected to server system 212. POS terminals 215 are interconnected to the Internet through many interfaces including a network, such as a local area network (LAN) or a wide area network (WAN), dial-in-connections, cable modems, wireless modems, and special high-speed ISDN lines. POS terminals 215 could be any device capable of interconnecting to the Internet and including an input device capable of reading information from a consumer's payment card.

A database server 216 is connected to database 220, which contains information on a variety of matters, as described below in greater detail. In one embodiment, centralized database 220 is stored on server system 212 and can be accessed by potential users at one of client systems 214 by logging onto server system 212 through one of client systems 214. In an alternative embodiment, database 220 is stored remotely from server system 212 and may be non-centralized.

Database 220 may include a single database having separated sections or partitions or may include multiple databases, each being separate from each other. Database 220 may store transaction data generated as part of sales activities conducted over the processing network, including data relating to merchants, account holders or customers, issuers, acquirers, and/or purchases made. For example, database 220 stores transaction data including at least one of timestamp data indicative of a time a payment transaction occurred, purchase data indicative of a product, i.e., a good or service, that has been purchased and/or leased, purchase amount data indicative of an amount of funds transferred as part of the payment transaction, merchant data including a merchant identifier that identifies the merchant and/or merchant location associated with the payment transaction, and/or cardholder data including at least one of a cardholder name, a cardholder address, a PAN, and any other account identifying information. Database 220 may store the merchant identifier in a list that identifies each merchant registered to use the network, and instructions for settling transactions including merchant bank account information.

Database 220 may also store cardholder identifiers and social media identifiers for cardholders who have registered with a social media payment processing program.

Services sub-system 204 includes cardholder computing device 217 and social media computing device 218. Social media computing device 218 is configured to communicate with at least one of server system 212, client systems 214, cardholder computing device 217, and fraud monitoring device 221. In the example embodiment, social media computing device 218 is associated with or controlled by a social media provider. The social media provider may store social media data for a plurality of social media accounts on social media computing device 218. For example, social media computing device 218 may host a social and/or professional networking service that is accessed by cardholders using cardholder computing devices 217 to perform social media activities. To enhance cardholder services, social media computing device 218 may store a circle of friends of the cardholder. Social media computing device 218 is interconnected to the Internet through many interfaces including a network, such as a local area network (LAN) or a wide area network (WAN), dial-in-connections, cable modems, wireless modems, and special high-speed ISDN lines. Social media computing device 218 could be any device capable of interconnecting to the Internet but not limited to, a desktop computer, a laptop computer, a personal digital assistant (PDA), a cellular phone, a smartphone, a tablet, a phablet, or other web-based connectable equipment. In one embodiment, social media computing device 218 is configured to communicate with client system 214 and/or cardholder computing device 217 using various outputs including, for example, Bluetooth communication, radio frequency communication, near field communication, network-based communication, and the like. More specifically, in one embodiment, social media computing device 218 communicates with cardholder computing device 217 through a website associated with the social media provider.

In the example embodiment, cardholder computing device 217 is a computer that includes a web browser or a software application, which enables cardholder computing device 217 to access social media computing device 218 using the Internet. More specifically, cardholder computing device 217 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Cardholder computing device 217 can be any device capable of accessing the Internet including, but not limited to, a desktop computer, a laptop computer, a personal digital assistant (PDA), a cellular phone, a smartphone, a tablet, a phablet, or other web-based connectable equipment.

System 200 also includes fraud monitoring device 221 that is in communication with payment sub-system 202 and/or services sub-system 204. Fraud monitoring device 221 may be a stand-alone computing device that includes a processor and a memory and is configured to communicate with server system 212, client system 214, cardholder computing device 217, social media computing device 218, and/or database 220. Alternatively, fraud monitoring device 221 may be integrated with server system 212. Fraud monitoring device 221 facilitates identifying fraudulent payment transactions performed with payment sub-system 202 based on social media connection data stored on social media computing device 218. More specifically, fraud monitoring device 221 retrieves social media connection data of cardholder 122, e.g., the cardholder's circle of friends, and determines the transaction history of one or more of the cardholder's friends to calculate a social risk score. Fraud monitoring device 221 is further configured to determine whether the payment transaction is fraudulent based on the results of the social risk score. In one embodiment, fraud monitoring device 221 is associated with, or is part of the payment system 120, or in communication with interchange network 128, both shown in FIG. 1. In another embodiment, fraud monitoring device 221 is associated with a third party and is merely in communication with the interchange network 128. In a further embodiment, fraud monitoring device 221 is associated with, or in communication with merchant 124, shown in FIG. 1.

Figure 3:
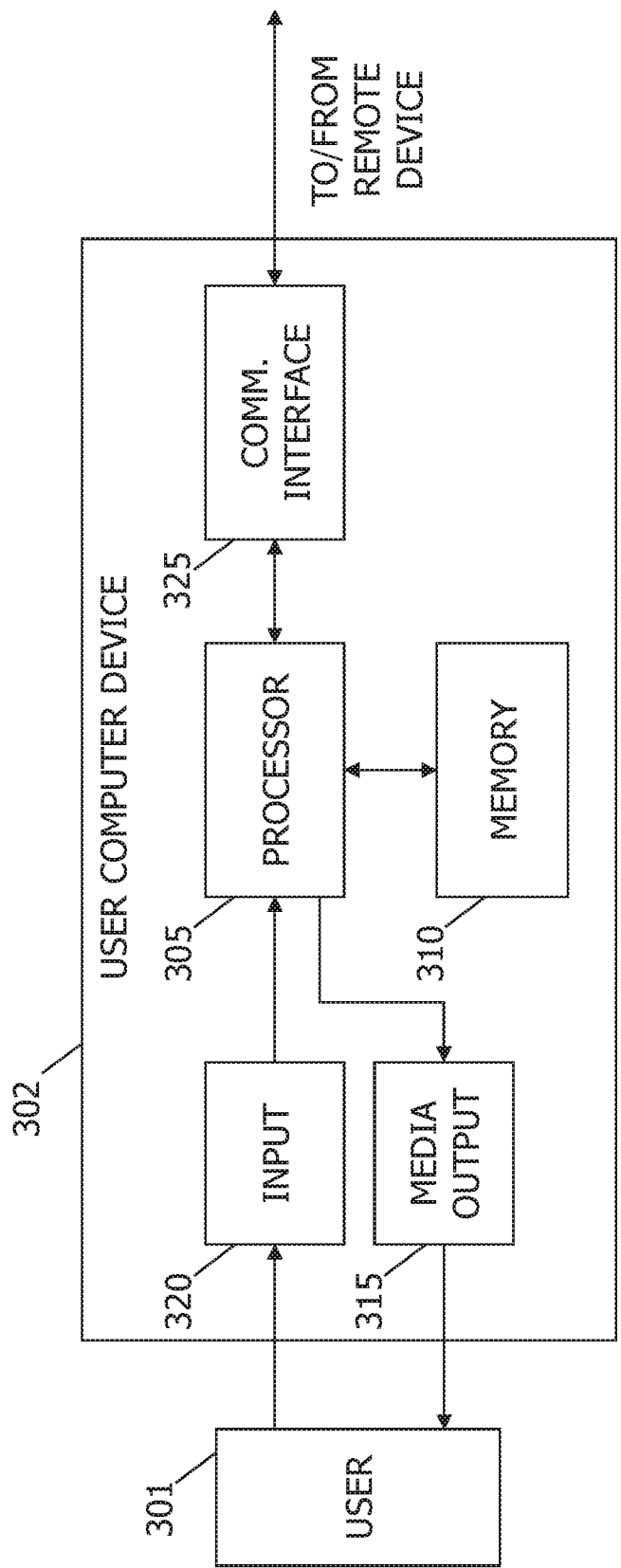

FIG. 3 illustrates an example configuration of a user computer device 302 operated by a user 301 such as cardholder computing device 217 shown in FIG. 2, in accordance with one embodiment of the present disclosure. User computer device 302 may include, but is not limited to, client systems 214, POS terminal 215, cardholder computing device 217, social media computing device 218, and fraud monitoring device 221 (all shown in FIG. 2). User computer device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or transaction data to be stored and retrieved. Memory area 310 may include one or more computer readable media.

User computer device 302 also includes at least one media output component 315 for presenting information to user 301. Media output component 315 is any component capable of conveying information to user 301. In some embodiments, media output component 315 includes an output adapter (not shown) such as a video adapter and/or an audio adapter. An output adapter is operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 315 is configured to present a graphical user interface (e.g., a web browser and/or a client application) to user 301. A graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computer device 302 may also include a communication interface 325, communicatively coupled to a remote device such as server system 212 (shown in FIG. 2). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from server system 212. A client application allows user 301 to interact with, for example, server system 212. For example, instructions may be stored by a cloud service, and the output of the execution of the instructions sent to the media output component 315.

Figure 5:
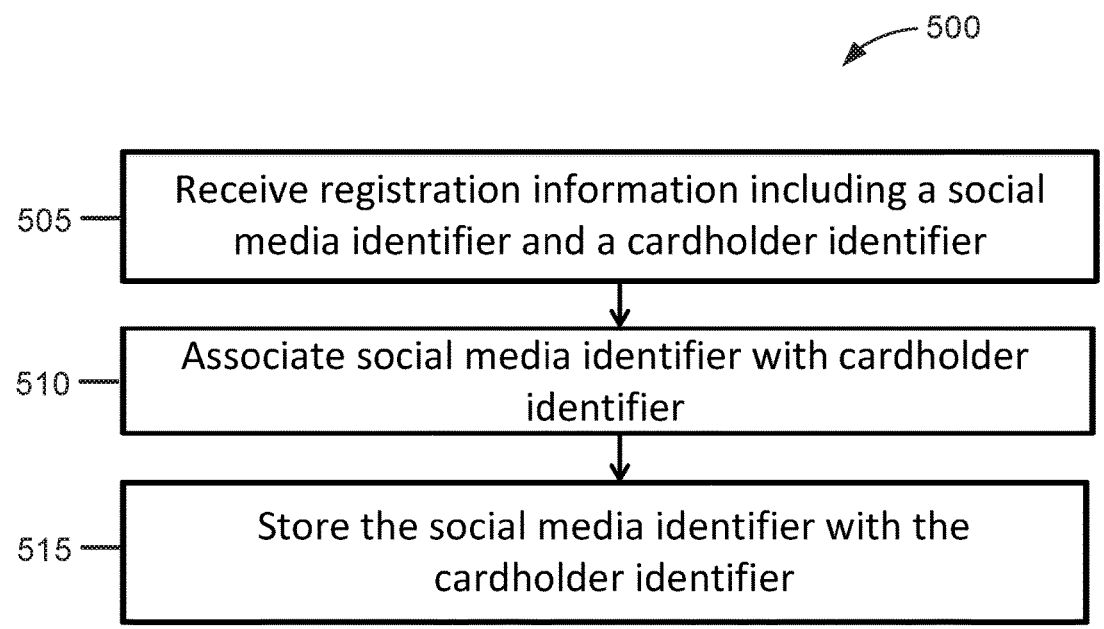
Figure 6:
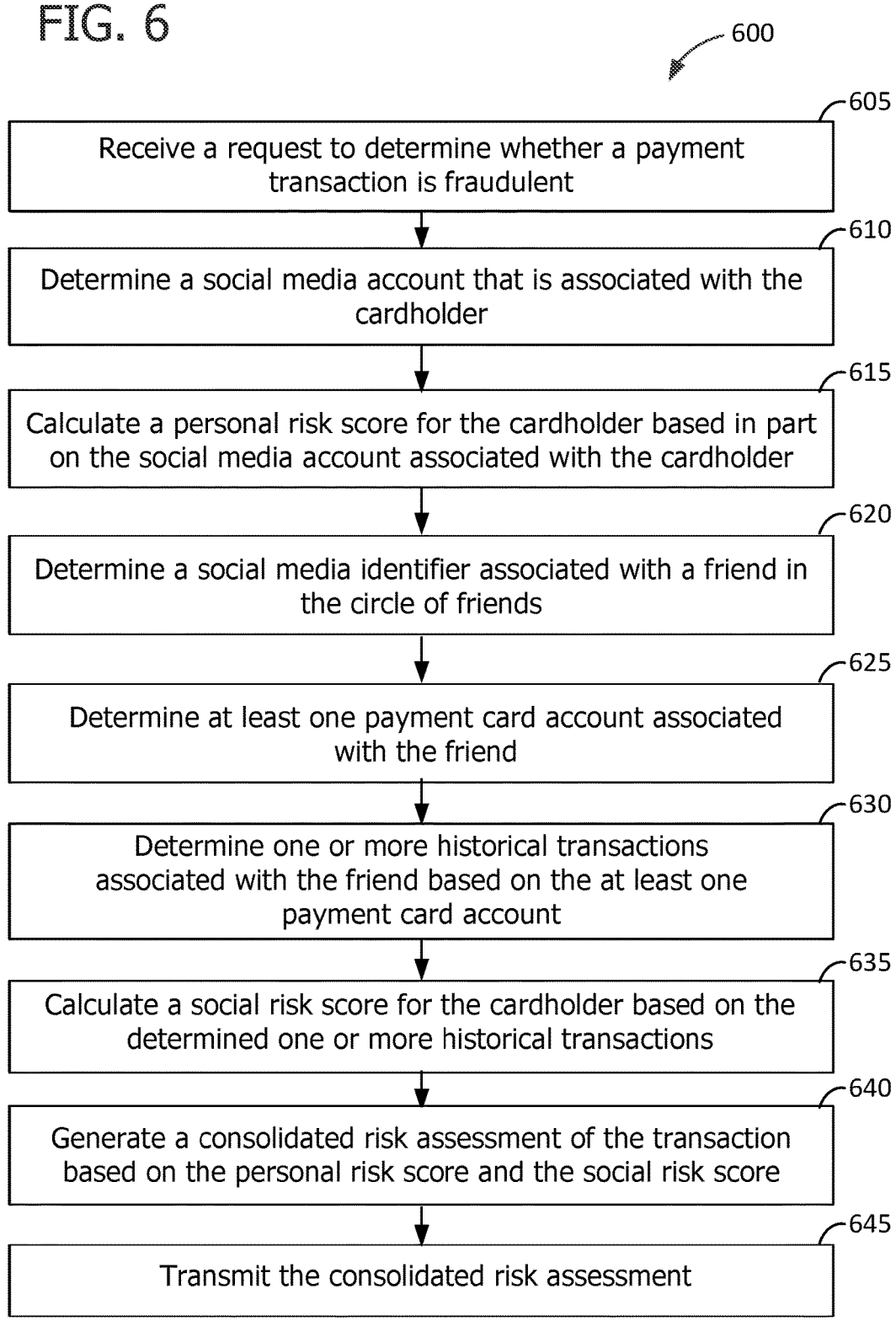

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 is programmed with the instruction such as illustrated in FIGS. 5 & 6.

Figure 4:
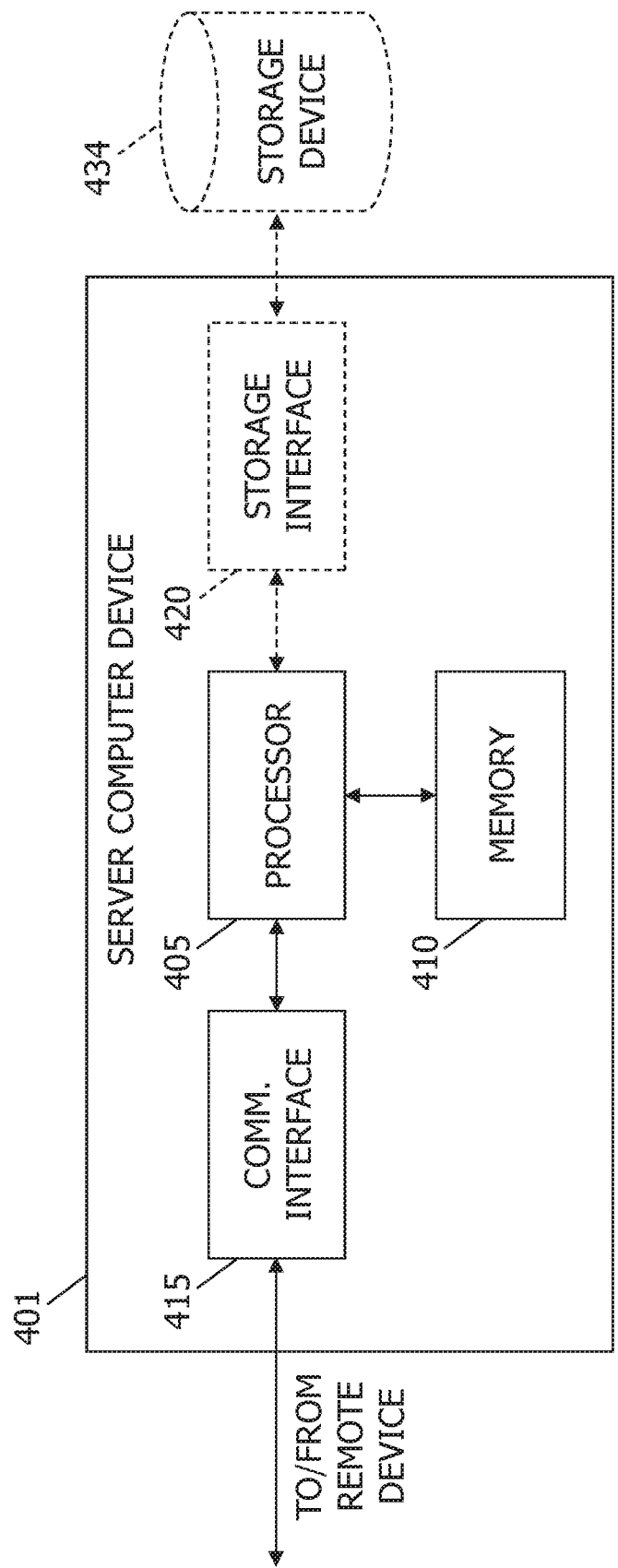

FIG. 4 illustrates an example configuration of a server computer device 401 such as server system 212 shown in FIG. 2, in accordance with one embodiment of the present disclosure. Server computer device 401 may include, but is not limited to, database server 216 and social media computing device 218 (shown in FIG. 2). Server computer device 401 also includes a processor 405 for executing instructions. Instructions may be stored in a memory area 410. Processor 405 may include one or more processing units (e.g., in a multi-core configuration).

Processor 405 is operatively coupled to a communication interface 415 such that server computer device 401 is capable of communicating with a remote device such as another server computer device 401, client systems 214, or fraud monitoring device 221 (both shown in FIG. 2). For example, communication interface 415 may receive requests from fraud monitoring device 221 via the Internet, as illustrated in FIG. 2.

Processor 405 may also be operatively coupled to a storage device 434. Storage device 434 is any computer-operated hardware suitable for storing and/or retrieving data, such as, but not limited to, data associated with database 220 (shown in FIG. 2). In some embodiments, storage device 434 is integrated in server computer device 401. For example, server computer device 401 may include one or more hard disk drives as storage device 434. In other embodiments, storage device 434 is external to server computer device 401 and may be accessed by a plurality of server computer devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

FIG. 5 is a flowchart of an example process 500 implemented by fraud monitoring device 221 shown in FIG. 2 to register a cardholder 122 (shown in FIG. 1) with a social media payment processing program. In the example embodiment, cardholder 122 enrolls in the social media payment processing program to increase the likelihood that the first e-commerce transactions with online merchants will be approved. In some embodiments, the social media payment processing program is associated with the payment processing network 120 (shown in FIG. 1) and cardholder 122 registers directly with fraud monitoring device 221. In other embodiments, the social media payment processing program is associated with merchant 124 (shown in FIG. 1). In these embodiments, cardholder 122 registers with the specific merchant on the merchant's website.

In the example embodiment, fraud monitoring device 221 receives 505 registration information that includes a social media identifier and a cardholder identifier associated with cardholder 122. The social media identifier is a unique alphanumeric series that identifies an individual social media account, e.g., a link or an email. The cardholder identifier could be the cardholder's payment account number or other unique identifier that represents the cardholder's payment card account. In the example embodiment, cardholder 122 uses cardholder computing device 217 (shown in FIG. 2) to register with the social media payment processing program on fraud monitoring device 221. Fraud monitoring device 221 associates 510 the social media identifier with the cardholder identifier. Fraud monitoring device 221 stores 515 the social media identifier and the cardholder identifier in database 220 (shown in FIG. 2).

FIG. 6 is a flowchart of an example process 600 implemented by fraud monitoring device 221 shown in FIG. 2 to perform risk assessment of payment transactions based on social media connection data. In the example embodiment, fraud monitoring device 221 receives 605 a request to determine whether a payment transaction is fraudulent. In some embodiments, fraud monitoring system 221 receives 605 the request directly from merchant 124 (shown in FIG. 1). In other embodiments, the request is an authorization request message provided by merchant bank 126, interchange network 128, or issuer bank 130 (all shown in FIG. 1) as part of payment card transaction processing shown in FIG. 1. In the example embodiment, the payment transaction is conducted by a payment cardholder 122 (shown in FIG. 1) at an online merchant 124. The request includes at least a cardholder identifier, which could be the cardholder's payment card account number. In various embodiments, the request could also include a social media identifier, a merchant identifier, and transaction information.

Fraud monitoring device 221 determines 610 a social media account associated with cardholder 122. In the example embodiment, cardholder 122 previously registered with fraud monitoring device 221 for the social media payment processing program, as described in FIG. 5. In the example embodiment, fraud monitoring device 221 retrieves the social media identifier that is associated with the cardholder identifier from database 220 (shown in FIG. 2). In other embodiments, the request includes a social media identifier, which identifies at least one social media account that cardholder 122 has with at least one social media network. Fraud monitoring device 221 transmits the social media identifier to social media computing device 218 (shown in FIG. 2) to access the social media account associated with cardholder 122. In the example embodiment, fraud monitoring device 221 executes one or more application programming interfaces (API) to access social media information about the social media account. In other embodiments, fraud monitoring device 221 logs directly into the social media account.

With access to the social media account, fraud monitoring device 221 calculates 615 a personal risk score for the transaction based at least in part on information in the social media account. In the example embodiment, fraud monitoring device 221 determines one or more historical payment card transactions associated with cardholder 122 based on data in the cardholder's social media account. In one example, cardholder 122 registered more than one cardholder identifier, where each cardholder identifier represents a different payment card account, with the social media identifier. In this example, fraud monitoring device 221 retrieves the additional cardholder identifiers from database 220, determines one or more historical payment transactions associated with those additional cardholder identifiers, and uses those transactions to calculate 615 the personal risk score. In another example, the request does not include the cardholder's name or other personally identifying information. From the social media account, fraud monitoring device 221 determines the identity of cardholder 122 and determines one or more additional payment card accounts associated with cardholder 122. Using the one or more additional payment card accounts, fraud monitoring device 221 determines one or more historical payment card transactions and uses those transactions to calculate 615 the personal risk score.

In other embodiments, fraud monitoring device 221 accesses the social media account to determine other information about cardholder 122, such as, but not limited to, address, IP address, email address, and other information about the cardholder computing device 217 (shown in FIG. 2). For example, fraud monitoring device 221 compares cardholder computing device 217 to client system 214 (shown in FIG. 2) that is being used to conduct the payment transaction in question. If the devices match, then fraud monitoring device 221 calculates 615 the personal risk score to indicate that. If, for example, the IP addresses indicate that cardholder computing device 217 is located in Montana and client system 214 is in Florida, then fraud monitoring device 221 calculates 615 the personal risk score to reflect that. In further embodiments, fraud monitoring device 221 accesses the cardholder's social media account to access the cardholder's browser history. For example, if the payment transaction is for a carpet, then fraud monitoring device 221 reviews the cardholder's browser history to determine if cardholder 122 has an interest in carpets and calculates 615 the personal risk score to reflect that interest or the lack thereof. Fraud monitoring device 221 is not limited to only using one of the above embodiments, but may use any combination of the above embodiments to calculate 515 the cardholder's personal risk score.

Fraud monitoring device 221 accesses the cardholder's social media account from social media computing device 218 to retrieve the cardholder's circle of friends. In the example embodiment, fraud monitoring device 221 determines 620 a social media identifier associated with a friend in the circle of friends, where the friend registered the social media identifier with the social media payment processing program on fraud monitoring device 221, as described in FIG. 5. Fraud monitoring device 221 retrieves the friend's card identifier from database 220. Using the friend's retrieved cardholder identifier, fraud monitoring device 221 determines 625 at least one payment card account associated with the friend. In other embodiments, fraud monitoring device 221 uses the friend's social media identifier to access the friend's social media account to determine an identity for the friend. Using that determined identity, fraud monitoring device 221 determines 625 at least one payment card account associated with the friend.

Fraud monitoring device 221 determines 630 one or more historical transactions associated with the determined payment card account. Using those historical transactions, fraud monitoring device 221 calculates 635 a social risk score for the transaction. Although the example embodiment only describes calculating a social risk score for one friend of the cardholder's circle of friends, historical transactions for multiple friends may be used to calculate 635 the social risk score. The more fraudulent transactions that are found in the cardholder's circle of friends, the higher the likelihood that the payment transaction is fraudulent.

In some embodiments, fraud monitoring device 221 is associated with merchant 124 and receives the request directly from merchant 124. In these embodiments, fraud monitoring device 221 determines an identity for one or more of the friends in the circle of friends. Based on the determined identities, fraud monitoring device 221 analyzes merchant's past transactions with the identified friends and calculates 635 the social risk score based on those past transactions.

Fraud monitoring device 221 generates 640 a consolidated risk assessment of the payment transaction based on the personal risk score and the social risk score. In the example embodiment, fraud monitoring device 221 transmits 645 the consolidated risk assessment to the device that the request was received from, i.e., merchant 124, merchant bank 126, interchange network 128, or issuer bank 130.

Figure 7:
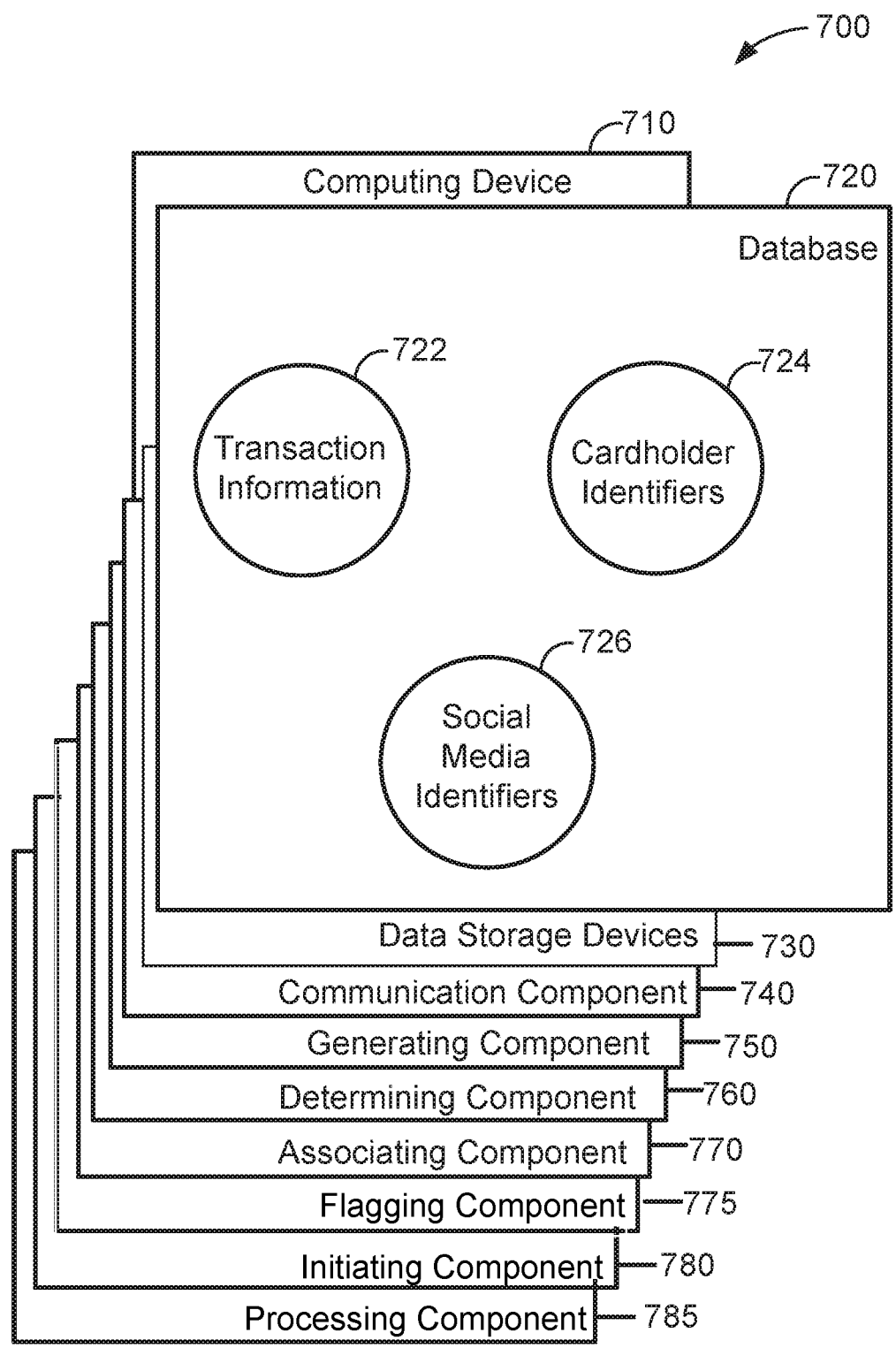

FIG. 7 is a diagram 700 of components of one or more example computing devices that may be used in system 200 shown in FIG. 2. In some embodiments, computing device 710 is similar to server system 212; it may also be similar to fraud monitoring device 221 (both shown in FIG. 2). Database 720 may be coupled with several separate components within computing device 710, which perform specific tasks. In this embodiment, database 720 includes transaction information 722, cardholder identifiers 724, and social media identifiers 726. In some embodiments, database 720 is similar to database 220 (shown in FIG. 2).

Computing device 710 includes the database 720, as well as data storage devices 730. Computing device 710 also includes a communication component 740 for receiving 605 a request, transmitting 645 the consolidated risk assessment (both shown in FIG. 6), and receiving 505 registration information (shown in FIG. 5). Computing device 710 also includes a determining component 750 for determining 610 a social media account, determining 620 a social media identifier determining 625 at least one payment card account, and determining 630 one or more historical transactions (all shown in FIG. 6). A calculating component 760 is also included for calculating 615 a personal risk score and calculating 635 a social risk score (both shown in FIG. 6). An associating component 770 is further included for associating 510 the social media indicator with the cardholder indicator (shown in FIG. 5). Moreover, a generating component 775 is included for generating 640 the consolidated risk assessment, as shown in FIG. 6. A processing component 780 assists with execution of computer-executable instructions associated with the system.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for accessing a fraud risk for an online transaction utilizing social media data, said method implemented using a fraud monitoring device in communication with a memory, said method comprising:
   receiving, by the fraud monitoring device, a social media identifier associated with an individual;
   accessing a social media account associated with the social media identifier, wherein the social media account includes a link to a friend social media account associated with a friend;
   determining one or more historical payment transactions associated with the friend; and
   calculating, by the fraud monitoring device, a social risk score for the individual based in part on the determined one or more historical payment transactions.

2. The method in accordance with claim 1, further comprising:
   receiving, by the fraud monitoring device, registration information for the individual including the social media identifier and a payment card account identifier; and
   storing, in the memory, the social media identifier and the payment card account identifier.

3. The method in accordance with claim 2, further comprising calculating a consolidated risk assessment of an online transaction associated with the individual based in part on the social risk score.

4. The method in accordance with claim 3 wherein calculating a consolidated risk assessment further comprises:
   retrieving, from the memory, a first payment card account identifier based on the social media identifier matching the stored social media identifier;
   determining, by the fraud monitoring device, one or more first cardholder historical payment transactions associated with the individual based on the first payment card account identifier;
   calculating, by the fraud monitoring device, a personal risk score for the individual based in part on the one or more first historical payment transactions; and
   generating, by the fraud monitoring device, the consolidated risk assessment of the online transaction based in part on the personal risk score and the social risk score.

5. The method in accordance with claim 4, further comprising:
   retrieving, from the memory, a second payment card account identifier based on the social media identifier matching the stored social media identifier;
   determining one or more second historical payment transactions associated with the second cardholder identifier; and
   calculating, by the fraud monitoring device, a personal risk score for the individual based in part on the one or more first historical payment transactions and the one or more second historical payment transactions.

6. The method in accordance with claim 1, wherein the received social media identifier is associated with an online transaction, and wherein the method further comprises:
   retrieving browser history data from the social media account associated with the individual;
   comparing the retrieved browsing history data with the online transaction;
   calculating, by the fraud monitoring device, a personal risk score for the individual based in part on the comparison; and
   generating, by the fraud monitoring device, a consolidated risk assessment of the online transaction based in part on the personal risk score and the social risk score.

7. The method in accordance with claim 1 wherein determining one or more historical payment transactions further comprises:
   determining a social media identifier associated with the friend;

determining at least one payment card account associated with the friend; and
retrieving one or more historical payment transactions associated with the friend based on the at least one payment card account.

8. The method in accordance with claim 1 wherein determining one or more historical payment transactions further comprises:
accessing the friend social media account associated with the friend;
determining an identity for the friend based on the friend social media account;
determining a payment card account associated with the friend based on the determined identity; and
retrieving one or more historical payment transactions associated with the friend based on the determined payment card account.

9. The method in accordance with claim 1 wherein receiving a social media identifier further comprises receiving a request to assess the fraud risk of an online transaction initiated by the individual using a payment card, wherein the fraud risk request includes the social media identifier.

10. A computer system for analyzing potentially fraudulent e-commerce payment transactions utilizing social media data, said computer system comprising:
a memory device for storing data; and
one or more processors in communication with said memory device, said one or more processors programmed to:
receive a social media identifier associated with an individual;
access a social media account associated with the social media identifier, wherein the social media account includes a link to a friend social media account associated with a friend;
determine one or more historical payment transactions associated with the friend; and
calculate a social risk score for the individual based in part on the determined one or more historical payment transactions.

11. The system in accordance with claim 10, wherein said processor is further programmed to:
receive registration information for the individual including the social media identifier and a payment card account identifier; and
store, in said memory device, the social media identifier and the payment card account identifier.

12. The system in accordance with claim 11, wherein said processor is further programmed to calculate a consolidated risk assessment of an online transaction associated with the individual based in part on the social risk score.

13. The system in accordance with claim 12, wherein said processor is further programmed to:
retrieve, from said memory device, a first payment card account identifier based on the social media identifier matching the stored social media identifier;
determine one or more first cardholder historical payment transactions associated with the individual based on the first payment card account identifier;
calculate a personal risk score for the individual based in part on the one or more first historical payment transactions; and
generate the consolidated risk assessment of the online transaction based in part on the personal risk score and the social risk score.

14. The system in accordance with claim 13, wherein said processor is further programmed to:

retrieve, from said memory device, a second payment card account identifier based on the social media identifier matching the stored social media identifier;
determine one or more second historical payment transactions associated with the second cardholder identifier; and
calculate a personal risk score for the individual based in part on the one or more first historical payment transactions and the one or more second historical payment transactions.

15. The system in accordance with claim 10, wherein the received social media identifier is associated with an online transaction, and wherein said processor is further programmed to:
retrieve browser history data from the social media account associated with the individual;
compare the retrieved browsing history data with the online transaction;
calculate a personal risk score for the cardholder based in part on the comparison; and
generate a consolidated risk assessment of the online transaction based in part on the personal risk score and the social risk score.

16. The system in accordance with claim 10, wherein said processor is further programmed to:
determine a social media identifier associated with the friend;
determine at least one payment card account associated with the friend; and
retrieve one or more historical payment transactions associated with the friend based on the at least one payment card account.

17. The system in accordance with claim 10, wherein said processor is further programmed to:
access the friend social media account associated with the friend;
determine an identity for the friend based on the friend social media account;
determine a payment card account associated with the friend based on the determined identity; and
retrieve one or more historical payment transactions associated with the friend based on the determined payment card account.

18. A computer-readable storage medium having computer-executable instructions embodied thereon, wherein when executed by a computing device having at least one processor coupled to a memory device, the computer-executable instructions cause the processor to:
receive a social media identifier associated with an individual;
access a social media account associated with the social media identifier, wherein the social media account includes a link to a friend social media account associated with a friend;
determine one or more historical payment transactions associated with the friend; and
calculate a social risk score for the individual based in part on the determined one or more historical payment transactions.

19. The computer-readable storage medium of claim 18, wherein the computer-executable instructions further cause the processor to:
retrieve a first payment card account identifier based on the social media identifier matching a stored social media identifier;

determine one or more first cardholder historical payment transactions associated with the individual based on the first payment card account identifier;

calculate a personal risk score for the individual based in part on the one or more first historical payment transactions; and generate a consolidated risk assessment of the individual based in part on the personal risk score and the social risk score.

20. The computer-readable storage medium of claim 18, wherein the computer-executable instructions further cause the processor to:

determine a social media identifier associated with the friend;

determine at least one payment card account associated with the friend; and retrieve one or more historical payment transactions associated with the friend based on the at least one payment card account.

* * * * *